US012100161B2

(12) United States Patent
Liu et al.

(10) Patent No.: US 12,100,161 B2
(45) Date of Patent: Sep. 24, 2024

(54) ORGAN SEGMENTATION METHOD AND SYSTEM

(71) Applicant: Covidien LP, Mansfield, MA (US)

(72) Inventors: Leo Liu, Shanghai (CN); Jianxin Ou, Shanghai (CN); Qi Tang, Shanghai (CN)

(73) Assignee: Covidien LP, Mansfield, MA (US)

(*) Notice: Subject to any disclaimer, the term of this patent is extended or adjusted under 35 U.S.C. 154(b) by 363 days.

(21) Appl. No.: 17/441,323

(22) PCT Filed: Mar. 21, 2019

(86) PCT No.: PCT/CN2019/079058
§ 371 (c)(1),
(2) Date: Sep. 21, 2021

(87) PCT Pub. No.: WO2020/186514
PCT Pub. Date: Sep. 24, 2020

(65) Prior Publication Data
US 2022/0180525 A1   Jun. 9, 2022

(51) Int. Cl.
*G06T 7/162* (2017.01)
*G06T 7/187* (2017.01)

(52) U.S. Cl.
CPC .............. *G06T 7/162* (2017.01); *G06T 7/187* (2017.01); *G06T 2207/10081* (2013.01);
(Continued)

(58) Field of Classification Search
CPC .................... G06T 7/162; G06T 7/187; G06T 2207/10081; G06T 2207/20036;
(Continued)

(56) References Cited

U.S. PATENT DOCUMENTS

| 10,964,012 B2 * | 3/2021 | Song .................... G06T 7/162 |
| 2011/0052028 A1 * | 3/2011 | Shreiber ................. G06T 7/11 |
| | | 382/128 |

(Continued)

FOREIGN PATENT DOCUMENTS

| CN | 103824295 A | 5/2014 |
| CN | 104809723 A | 7/2015 |

(Continued)

OTHER PUBLICATIONS

International Search Report and Written Opinion of the International Searching Authority issued in corresponding application PCT/CN2019/079058 mailed Dec. 30, 2019 (9 pages).

*Primary Examiner* — Charles T Shedrick
(74) *Attorney, Agent, or Firm* — Carter, DeLuca & Farrell LLP

(57) ABSTRACT

A method for identifying a liver in a CT image of a patient is provided. The method includes applying a liver model to the CT image. The method further includes extracting an internal liver region and an external liver region from the CT image based on the applied liver model. The method also includes performing a graph cut algorithm on the CT image based on the internal liver region and the external liver region to produce a liver image. The performing of the graph cut algorithm on the CT image to produce the liver image may be further based on an internal heart and/or kidney region and an external heart and/or kidney region. A non-transitory computer-readable storage medium encoded with a program is provided.

16 Claims, 15 Drawing Sheets

(52) U.S. Cl.
CPC .............. *G06T 2207/20036* (2013.01); *G06T 2207/20072* (2013.01); *G06T 2207/30048* (2013.01); *G06T 2207/30056* (2013.01); *G06T 2207/30084* (2013.01)

(58) Field of Classification Search
CPC .......... G06T 2207/20072; G06T 2207/30048; G06T 2207/30056; G06T 2207/30084
See application file for complete search history.

(56) References Cited

U.S. PATENT DOCUMENTS

| | | | | |
|---|---|---|---|---|
| 2011/0317888 | A1* | 12/2011 | Simon | G06T 7/11 382/128 |
| 2012/0207366 | A1* | 8/2012 | Liu | G06T 7/187 382/128 |
| 2013/0051645 | A1* | 2/2013 | Kim | G06F 18/00 382/131 |
| 2013/0267755 | A1* | 10/2013 | Chebrolu | A61N 5/1049 600/1 |
| 2014/0029812 | A1* | 1/2014 | Kriston | G06T 7/70 382/128 |
| 2014/0046172 | A1* | 2/2014 | Kim | A61B 8/085 600/407 |
| 2017/0042495 | A1* | 2/2017 | Matsuzaki | A61B 5/055 |
| 2018/0350266 | A1* | 12/2018 | García Calderon | G09B 23/34 |
| 2019/0130576 | A1* | 5/2019 | Wu | G16H 30/40 |

FOREIGN PATENT DOCUMENTS

| | | | |
|---|---|---|---|
| CN | 105139377 A | | 12/2015 |
| CN | 106997594 A | | 8/2017 |
| CN | 109934829 A | * | 6/2019 |

* cited by examiner

ORGAN SEGMENTATION METHOD AND SYSTEM

CROSS REFERENCE TO RELATED APPLICATIONS

This application is a U.S. National Stage Application filed under 35 U.S.C. § 371(a) of International Patent Application No. PCT/CN2019/079058, filed Mar. 21, 2019.

BACKGROUND

1. Technical Field

The present disclosure relates to a system and method for identifying an organ, and in particular relates to liver segmentation in clinical applications.

2. Discussion of Related Art

When planning a treatment procedure, clinicians often rely on patient data including X-ray data, computed tomography (CT) scan data, magnetic resonance imaging (MRI) data, or other imaging data that allows the clinician to view the internal anatomy of a patient. The clinician utilizes the patient data to identify targets of interest and to develop strategies for accessing the targets of interest for the surgical procedure.

The use of CT images as a diagnostic tool has become routine and CT results are frequently a source of information available to a clinician regarding the size and location of a lesion, tumor or other similar target of interest. CT images are typically obtained by digitally imaging a patient in slices in each of the axial, coronal and sagittal directions. A clinician reviews the CT image data slice by slice from each direction when attempting to identify or locate a target.

Liver segmentation in medical images, especially in CT images is an important requirement in many clinical applications, such as liver transplantation, resection, and ablation. Manual delineation is a time-consuming and challenging task due to anatomical shape variations. Therefore, an automatic liver segmentation method to extract liver anatomy structure from 3D CT images is desirable.

SUMMARY

In an aspect of the present disclosure, a method for identifying a liver in a CT image of a patient is provided. The method includes applying a liver model to the CT image. The method further includes extracting an internal liver region and an external liver region from the CT image based on the applied liver model. The method also includes performing a graph cut algorithm on the CT image based on the internal liver region and the external liver region to produce a liver image.

In another aspect of the present disclosure, the method also includes applying a heart model to the CT image, and extracting an internal heart region and an external heart region from the CT image based on the applied heart model. The performing of the graph cut algorithm on the CT image to produce the liver image may be further based on the internal heart region and the external heart region.

In a further aspect of the present disclosure, the method includes applying a kidney model to the CT image, and extracting an internal kidney region and an external kidney region from the CT image based on the applied kidney model. The performing of the graph cut algorithm on the CT image to produce the liver image may be further based on the internal kidney region and the external kidney region.

In yet another aspect of the present disclosure, extracting the internal liver region from the CT image is further based on the external kidney region and the external heart region.

In an aspect of the present disclosure, extracting the external liver region from the CT image is further based on the internal kidney region and the internal heart region.

In another aspect of the present disclosure, the method further includes extracting a body mask from the CT image. The performing of the graph cut algorithm on the CT image to produce the liver image may be further based on the body mask.

In yet another aspect of the present disclosure, the method also includes extracting a cavity mask from the CT image based in part on the body mask. The performing of the graph cut algorithm on the CT image to produce the liver image may be further based on the cavity mask.

In an aspect of the present disclosure, a non-transitory computer-readable storage medium encoded with a program is provided. The program, when executed by a processor, causes the processor to perform the steps of any one or more of the methods described herein.

Any of the above aspects and embodiments of the present disclosure may be combined without departing from the scope of the present disclosure.

BRIEF DESCRIPTION OF THE DRAWINGS

Objects and features of the presently disclosed system and method will become apparent to those of ordinary skill in the art when descriptions of various embodiments thereof are read with reference to the accompanying drawings, of which.

DETAILED DESCRIPTION

Although the present disclosure will be described in terms of specific illustrative embodiments, it will be readily apparent to those skilled in this art that various modifications, rearrangements and substitutions may be made without departing from the spirit of the present disclosure. The scope of the present disclosure is defined by the claims appended hereto.

The present disclosure proposes an automatic liver segmentation method to extract liver anatomy structure from 3D CT images. Conventional liver segmentation tools are user-interactive and time-consuming, may require contrast enhancement CT images, and may be unable to extract a liver from a normal CT scan without contrast.

Segmentation is a type of processing algorithm that is typically applied to medical images in an attempt to define the boundaries of various types of tissue by comparing the values of each data element of the CT image data or the generated 3D reconstruction to a series of thresholds or other similar criteria. The segmentation algorithm groups together similar types of tissue, for example, lungs, airways, lung lobes, nodules, vessels, liver, ribs, heart, or other critical structures, based on the outcome of the comparison. Each group may then be separately processed for rendering and presentation to a clinician. For example, because the intensity of each pixel in a CT image is equivalent to an actual density of the tissue material that was scanned, segmentation may be used to separate tissue material having different densities by analyzing the intensity values in the CT image.

One benefit of segmentation is the ability to present each critical structure of the patient's anatomy to the clinician in a visual form having a different color and/or transparency. This provides the clinician with an easy way of identifying different tissue types within the same image. For example, once segmented into groups, the lungs, airways, bones, etc. can each be presented with a different color or different transparency setting that may be adjustable by the clinician.

The presently disclosed technology provides significant benefits over the current state of the art. For example, the liver segmentation method according to the present disclosure operates automatically, without user interaction. The present technology works in both contrast CT image and normal CT images. The present technology uses a pre-trained liver model for improved accuracy and acceleration, and also uses pre-trained kidney and heart models to mark non-liver region for accuracy improvement.

Figure 1:
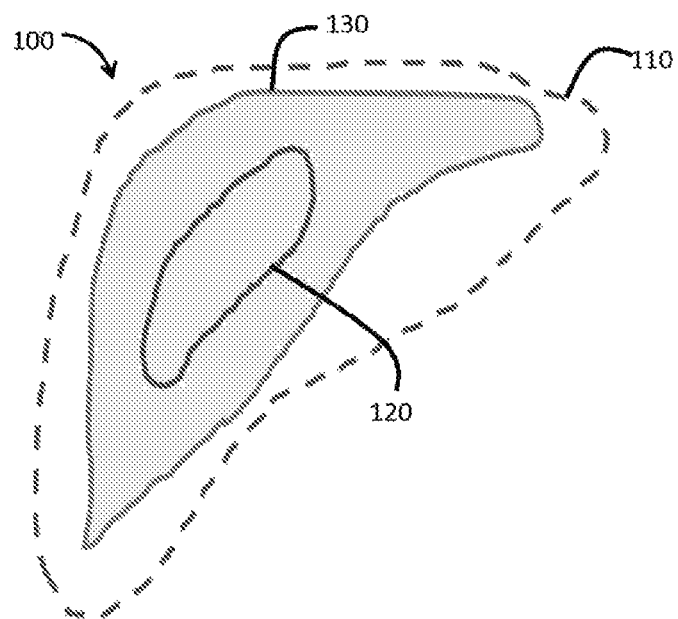
FIG. 1 illustrates identification of internal and external regions of a liver in accordance with an illustrative embodiment of the present disclosure.
Figure 2:
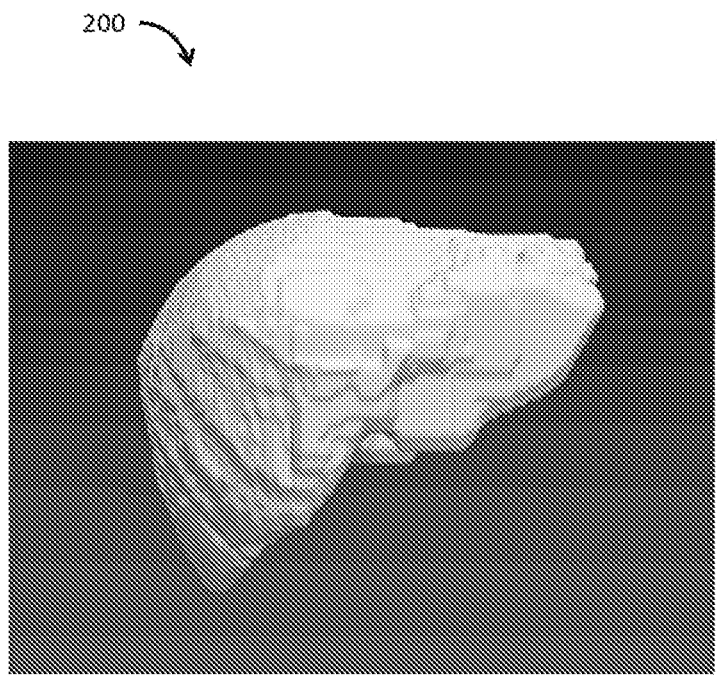
FIG. 2 illustrates a liver mask produced in accordance with an illustrative embodiment of the present disclosure.

FIG. 1 illustrates identification of internal and external regions of a liver, which may be used in a graph-based method, for example, a graph cut algorithm, to obtain liver mask 200 shown in FIG. 2. In FIG. 1, image 100 includes liver boundary 130, external liver region boundary 110, and internal liver region boundary 120. The boundary of liver boundary 130 lies between external liver region boundary 110 and internal liver region boundary 120. The liver is a large organ in the abdomen but it may be hard to visually extract directly. An algorithm according to the present technology first identifies two liver regions, an internal region and an external region, as shown in FIG. 1. Internal liver region boundary 120 is totally inside liver boundary 130 and external liver region boundary 110 includes all of liver boundary 130. Then a modified graph cut method will be applied to get the liver final mask result. The final mask result contains all of internal liver region boundary 120 and does not exceed external liver region boundary 110.

According to human anatomy, the liver is close to the heart, kidney and rib cage. The intensity in a CT image of the heart and kidney may be similar to the liver, especially in normal CT scans. Therefore, it may be difficult to separate them without some constraints. In most available software for this purpose, user interaction is required to specify a liver initial region and exclude the connected non-liver organs. In the present technology, pre-trained liver, heart, and kidney models are used to locate liver initial internal and external regions. Then, based on the detected internal and external regions of the liver, heart and kidney, the liver result can be computed by a graph cut method, to produce liver image 200 shown in FIG. 2.

Figure 3:
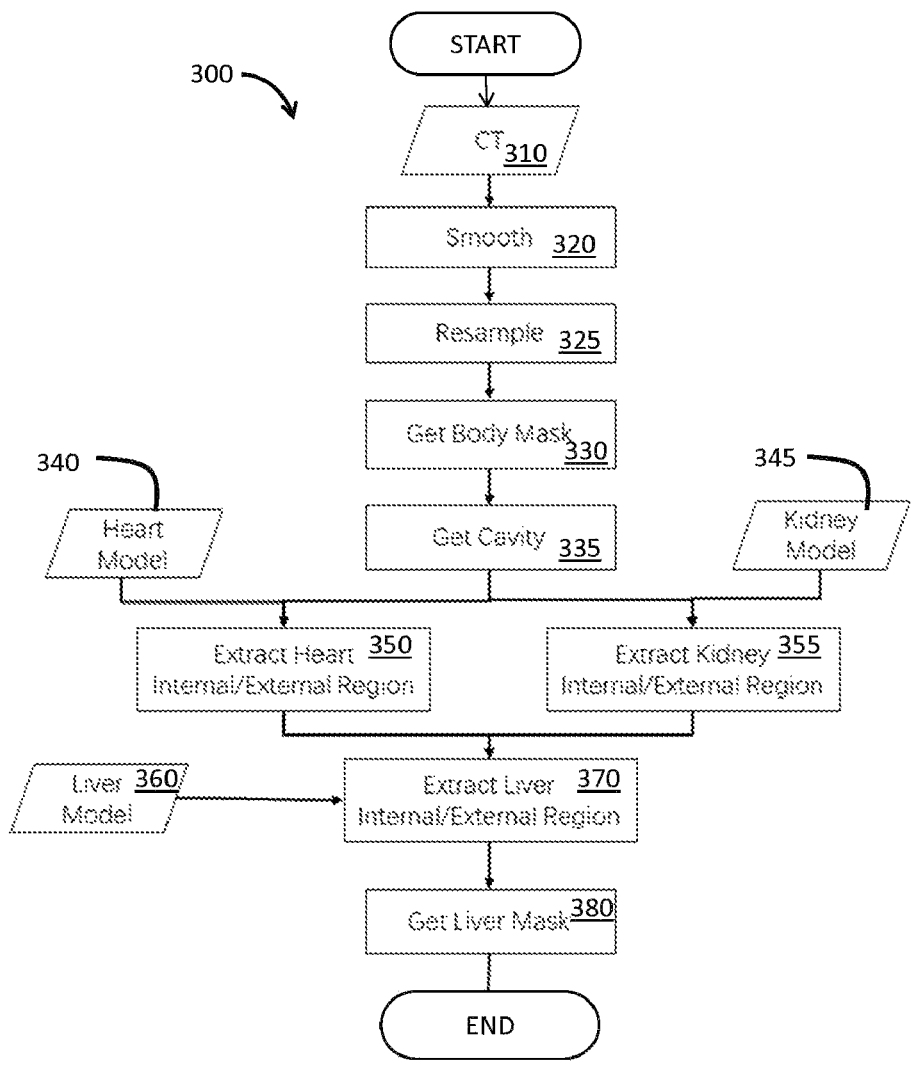
FIG. 3 is a flow chart illustrating a method of producing a liver mask in accordance with an embodiment of the present disclosure.
Figure 7A:
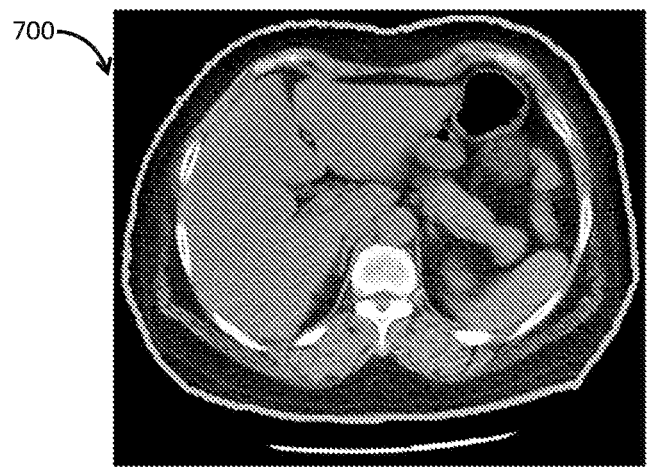
FIGS. 7A and 7B illustrate a body mask and cavity mask in a CT images, in accordance with an illustrative embodiment of the present disclosure.
Figure 7B:

FIG. 3 is flowchart 300 illustrating a summary of the process, which may include some or all of the following operations. A CT image is obtained in operation 310, and in operation 320, gaussian smoothing, or another appropriate smoothing technique, is used to smooth the input CT image slice by slice. In operation 325, the smoothed CT image is resampled to 4 mm by 4 mm by 4 mm spacing, or any other appropriate dimension, along the x, y and z axes. Then, in operation 330, a patient body mask is extracted to restrict the search area of the liver. A cavity mask is used in operation 335 to further restrict the search area for the liver, and to re-locate the trained model mask onto the input CT image. The difference between the body and cavity is shown in FIGS. 7A and 7B, in which body mask 700 is shown in FIG. 7A, and cavity mask 710 is shown in FIG. 7B.

As discussed above, the heart is an organ that is often connected to the liver in a CT image, especially in a normal CT image. Based on cavity information, a pre-trained heart model, obtained in operation 340 of FIG. 3 is placed on the specified patient data. Then heart internal/external regions are extracted based on the model position in operation 350.

Likewise, the kidney is another organ that is often connected to the liver in a CT image, especially in a normal CT image. Based on cavity and spinal information, a pre-trained kidney model, obtained in operation 345 of FIG. 3, is placed on the specified patient data. Then kidney internal/external regions are extracted based on the model position in operation 355.

Similarly to the extractions in operations 350 and 355 for a heart and kidney, respectively, a pre-trained liver model is placed on patient data. Based on the model position and related heart and kidney region, a liver internal/external region is extracted in operation 370.

A central step in final liver extraction includes use of a graph cut method. The algorithm is used in image segmentation based on an object's foreground and background information. According to the present technology, the foreground and background information are generated from the liver internal and external region. In this manner, a liver mask is obtained in operation 380.

Figure 4:
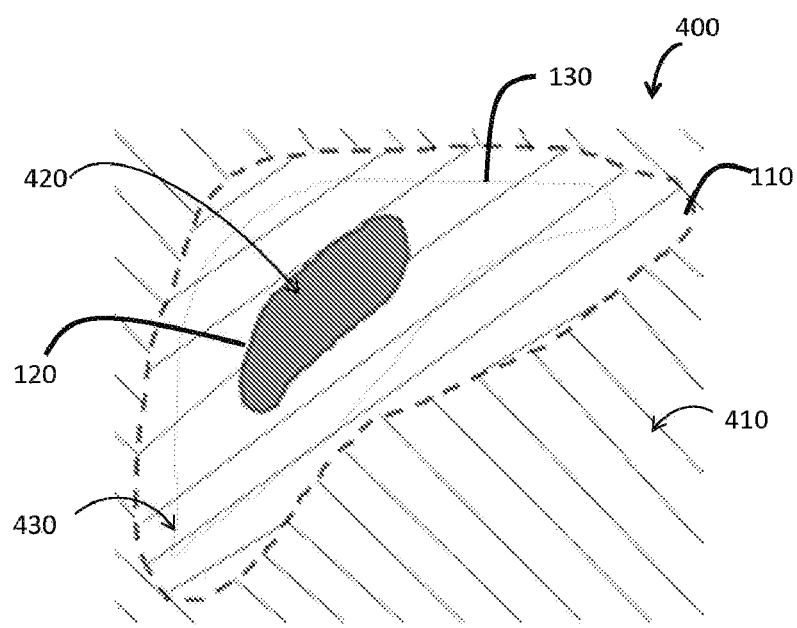
FIG. 4 is an illustration of internal and external regions of a liver, and an identification of the regions lying between these boundaries, in accordance with an illustrative embodiment of the present disclosure.

Referring to FIG. 4, which expands on the identifications shown in FIG. 1, image 400 includes liver boundary 130, liver external region boundary 110, and internal liver region boundary 120. Also shown in FIG. 4 are the regions between the boundaries, including foreground region 420, which is bounded by internal liver region boundary 120, and which represents an interior portion of the liver. Background region 410 is bounded by external to liver external region boundary 110, and represents an area that is definitively not the liver. Background region 410 is bounded by external to liver external region boundary 110, and represents an area that is definitively not the liver. Uncertain region 430 is bounded externally by liver external region boundary 110 and internally by internal liver region boundary 120, and represents an area that is not yet determined to be liver material or not, and which includes liver boundary 130.

Figure 5:
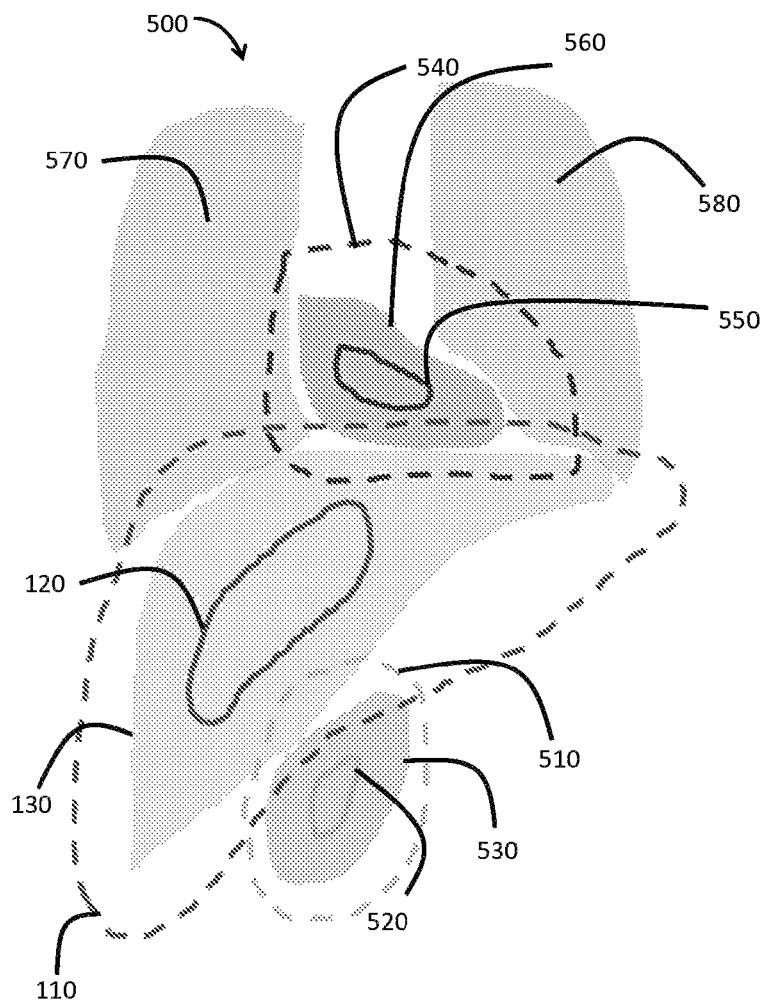
FIG. 5 illustrates identification of internal and external regions of a liver, a kidney and a heart, along with right and left lung lobes, in accordance with an illustrative embodiment of the present disclosure.

The anatomical relationship of the liver and the neighboring organs is shown in diagram 500 in FIG. 5. In order to get a good liver segmentation result, some parts of the heart and kidney regions should be excluded from external liver region boundary 110. Otherwise, a final graph cut result may contain parts of the heart and/or kidney, because they are connected together in the CT image. FIG. 5 shows liver boundary external 130, liver region boundary 110, and internal liver region boundary 120.

Similar internal and external regions of heart and kidney are found using the algorithm. Also shown in FIG. 5 are heart boundary 560, external heart region boundary 540, and internal heart region boundary 550. Further shown in FIG. 5 are kidney boundary 530, external kidney region boundary 510, and internal kidney region boundary 520.

Pursuant to the present technology, liver external region boundary 110 will not touch internal heart region boundary 550 and internal kidney region boundary 520. Additionally, according to FIG. 5, liver internal region boundary 120 will not collapse with external heart region boundary 540 and external kidney region boundary 510. The lung image density is constant in both normal and enhancement CT, and it may be easier to extract, so left lung lobe 570 and right lung lobe 580 (which may alternatively be reversed in orientation) can be referenced to confirm the liver position. There are three trained models for the liver, heart and kidney, which cover all possible regions of each organ. An initial constraint for the algorithm are the largest external regions for each organ, based on the respective trained models. Based on the respective trained models, a small internal region will be found. Then the algorithm operates to enlarge the internal regions and reduce external regions of each respective organ. The inputs for the algorithm include liver CT image data (enhancement CT or normal CT data) and trained liver, heart, and/or kidney models. The outputs include a liver mask image and the constraints. The CT image data includes all liver regions, likely also includes at least part of one or both lung lobes, but need not include the entire heart or kidney.

Figure 6A:
FIGS. 6A to 6D illustrate coronal views of same patient CT images, including enhancement and normal CT images, in accordance with an illustrative embodiment of the present disclosure.
Figure 6B:
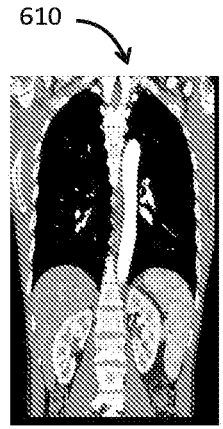
Figure 6C:
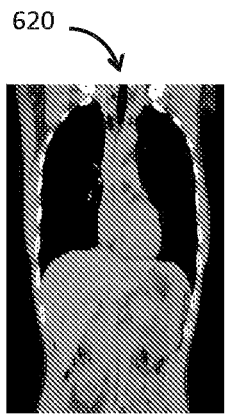
Figure 6D:
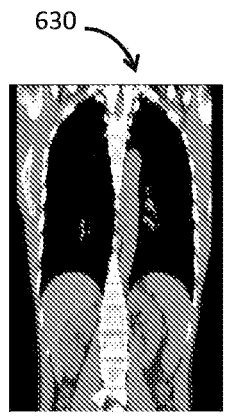

FIGS. 6A to 6D illustrate coronal views of same patient CT images, including enhancement and normal CT images. FIG. 6A shows CT enhancement image 600, which shows the liver in conjunction with the heart. FIG. 6B shows CT enhancement image 610, which shows the liver in conjunction with the kidney. FIG. 6C shows CT normal image 620, which shows the liver in conjunction with the heart. FIG. 6D shows CT normal image 630, which shows the liver in conjunction with the kidney. The density of the liver, heart and kidney varies between normal CT and enhancement CT, and the density is similar in a normal CT.

Figure 8:
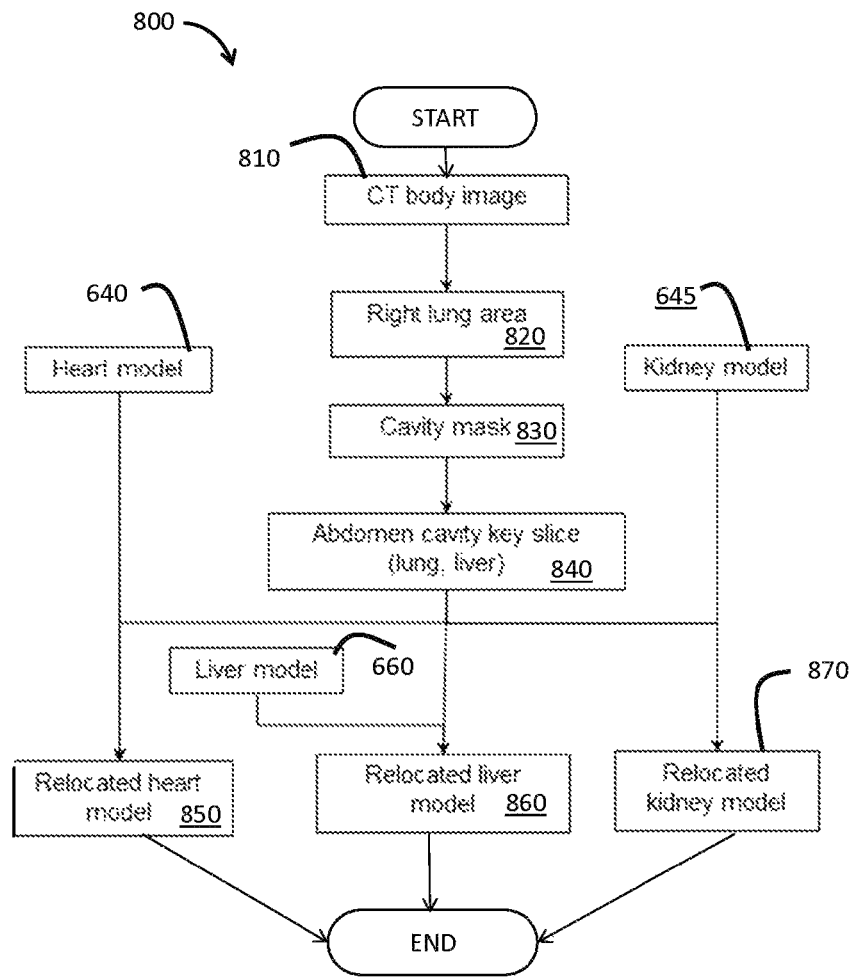
FIG. 8 is a flow chart illustrating a method of extracting an abdominal cavity and relocating models, in accordance with an embodiment of the present disclosure.

FIG. 8 is a flow chart illustrating method 800 of extracting an abdominal cavity and relocating models. From the start oval, the process flows to operation 810, which indicates to obtain a CT body image. When extracting liver internal and external regions, the input CT image may be down-sampled at a resolution of 4 mm by 4 mm by 4 mm to reduce CPU usage. Before the down-sampling action, a 5 by 5 gaussian-kernel, or similar smoothing filter, may be applied to process the CT image slice by slice. In the CT data, there may be noise, which may be removed by preprocessing. This may be accomplished by region growing two times. The first region growing may include growing from the seed outside the body to link all pixels outside the body. The second region growing may link pixels from the center of the image (of the body) based on the seed inside the body. Such a solution can remove objects outside the body.

From operation 810, the flow in method 800 proceeds to operation 820, which indicates to calculate the right lung area. The right lung area is calculated based on air density with a region growing method. Then lung/body size ratio is calculated, which may assume a lung area size is maximum in a liver top slice position. The lung/body area ratio may decrease downwards in progressive slices. The slice when the ratio is smaller than 0.15 may be approximately where the liver area size is largest.

From operation 820, the flow in method 800 proceeds to operation 830, which indicates to obtain the cavity mask. From operation 830, the flow in method 800 proceeds to operation 840, which indicates to get liver abdomen cavity information. When the cleaned body mask is ready, the algorithm extracts abdomen cavity mask and key slice positions. Based on the abdomen information from operation 840, the trained liver model from input 660 may be relocated to a proper position in operation 860. Further, based on the abdomen information from operation 840, the trained heart model from input 640 may be relocated to a proper position in operation 850. Additionally, based on the abdomen information from operation 840, the trained kidney model from input 645 may be relocated to a proper position in operation 870. Relocating the trained models may include translating and scaling the trained models based on the real CT data, including cavity center and size information. The relocation may further include removing model parts which are air in the CT image. The relocated model masks may be considered as the initial organ external regions.

Figure 9A:
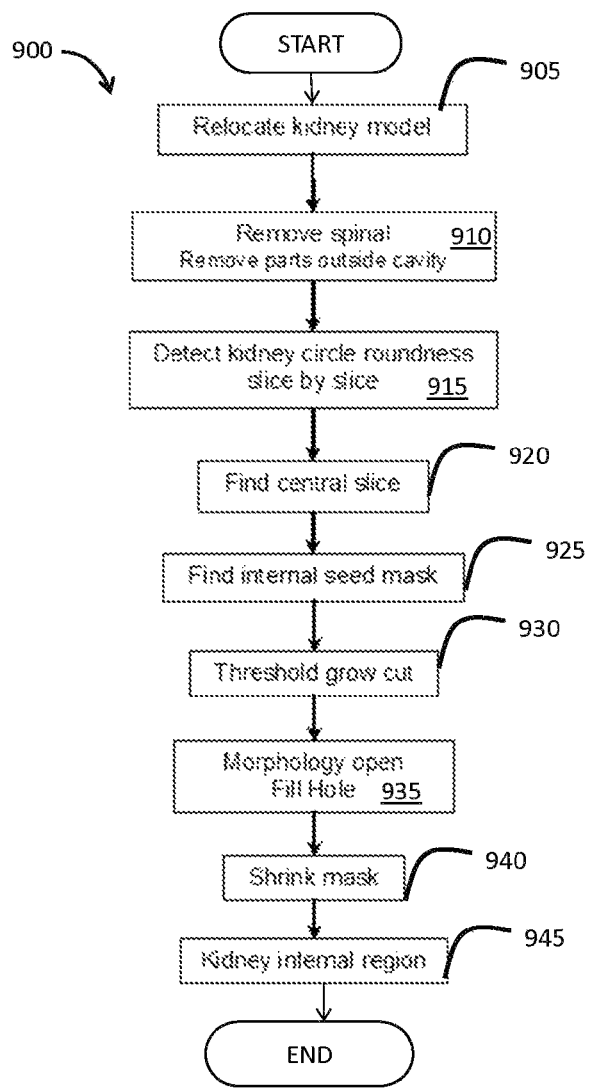
FIGS. 9A and 9B are flow charts illustrating a method of extracting kidney and heart internal and/or external regions, in accordance with an embodiment of the present disclosure.

FIG. 9A is a flow chart illustrating method 900 of extracting kidney internal and/or external regions. From the start oval, the process flows to operation 905, which indicates to relocate the kidney model. From operation 905, the flow in method 900 proceeds to operation 910, which indicates to remove the spine and remove parts outside cavity. From operation 910, the flow in method 900 proceeds to operation 915, which indicates to detect kidney circle roundness slice by slice. From operation 915, the flow in method 900 proceeds to operation 920, which indicates to find the central slice. From operation 920, the flow in method 900 proceeds to operation 925, which indicates to find internal seed mask. The kidney internal seed position is calculated based on the region circle roundness. The present algorithm selects the seed points in the slice where the possible kidney shape is most like a circle. From operation 925, the flow in method 900 proceeds to operation 930, which indicates to perform a threshold grow cut. A modified threshold grow cut method is adopted to enlarge the internal region instead of a simple region growing method. From operation 930, the flow in method 900 proceeds to operation 935, which indicates to perform morphology to fill open holes. From operation 935, the flow in method 900 proceeds to operation 940, which indicates to shrink the mask. From operation 940, the flow in method 900 proceeds to operation 945, which indicates to obtain the kidney internal region. The kidney internal and/or external regions extraction method are similar to a heart internal and/or external regions extraction method. The relocated kidney model may be treated as an external region, and then the process locates an internal region. From operation 945, the flow in method 900 proceeds to the end oval.

A spinal mask is used in liver and kidney internal/external regions extraction. The spinal mask is segmented with a simple threshold method and then three-dimensional morphology is performed post processing to shrink the mask. The relocated heart model can be treated as the initial heart external region which covers all possible heart regions. An internal heart region may be found in the relocated model mask. In many CT images, the heart is connected to the liver, so the segmentation result of a simple region growing in the heart will touch the liver. The present technology solves this problem through a morphology erosion operation to decrease the mask with an adaptive radius. In slices that result that touch the liver, the radius should be larger. The present technology provides for performing region growing two times. The first time region growing is performed in the whole cavity, and the second time it is done in the heart external region.

Figure 9B:
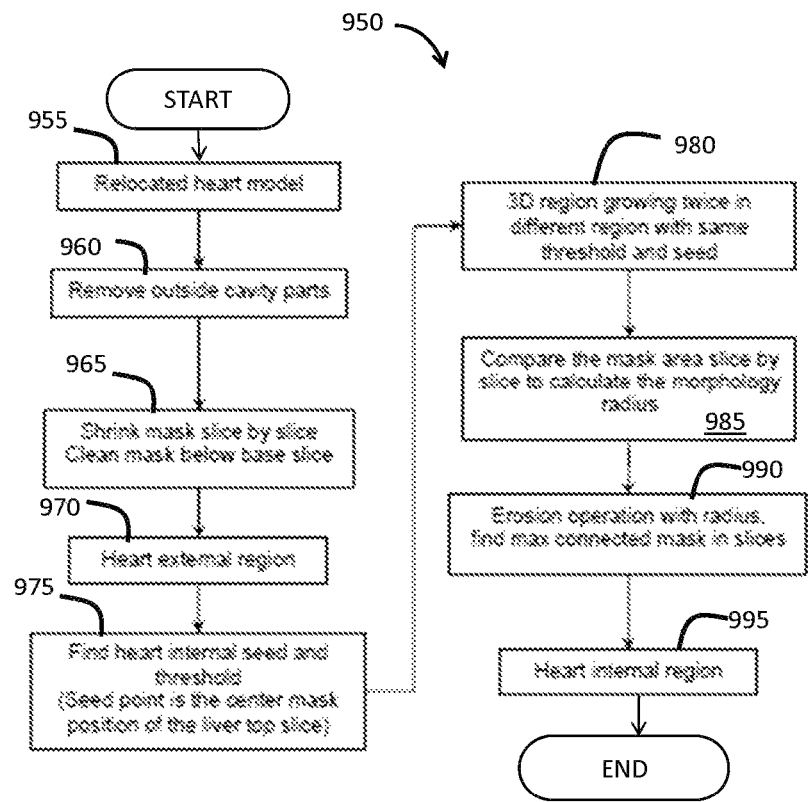

FIG. 9B is a flow chart illustrating method 950 of extracting heart internal and/or external regions. From the start oval, the process flows to operation 955, which indicates to relocate the heart model. From operation 955, the flow in method 950 proceeds to operation 960, which indicates to remove the outside cavity parts. From operation 960, the flow in method 950 proceeds to operation 965, which indicates to detect shrink the mask slice by slice, and clean the mask below the slice. In the shrink method of operation 965, a central slice is assumed as a maximum area slice, and the mask of other slices should not overrun their region. The mask gets smaller, and the process removes exceeded parts of the mask recursively slice by slice. From operation 965, the flow in method 950 proceeds to operation 970, which indicates to identify the heart external region. From operation 970, the flow in method 950 proceeds to operation 975, which indicates to find heart internal seed and threshold. The seed point is the center mask position of the liver top slice. From operation 975, the flow in method 950 proceeds to operation 980, which indicates to perform two times a three-dimensional growing in different regions with the same threshold and seed. From operation 980, the flow in method 950 proceeds to operation 985, which indicates to compare the mask area slice by slice to calculate the morphology radius. From operation 985, the flow in method 950 proceeds to operation 990, which indicates to perform an erosion operation with the radius, and find the maximum connected mask in the slices. From operation 990, the flow in method 950 proceeds to operation 995, which indicates to obtain the heart internal region. From operation 995, the flow in method 950 proceeds to the end oval.

Figure 10:
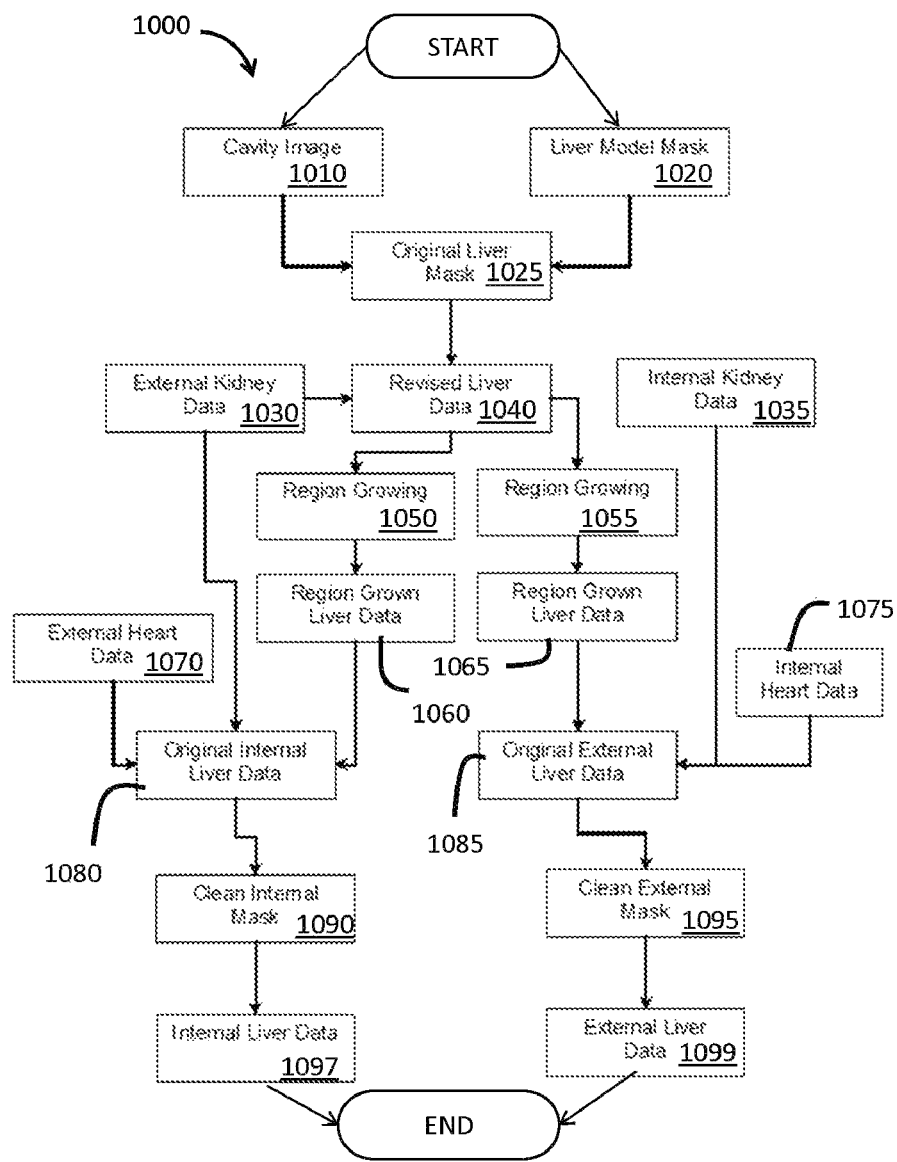
FIG. 10 is a flow chart illustrating a method of initializing liver data, in accordance with an embodiment of the present disclosure.

FIG. 10 is a flow chart illustrating method 1000 of initializing liver data. From the start oval, the process flows to operation 1010, which indicates to receive a cavity image. The flow in method 1000 also proceeds from the start oval to operation 1020, which indicates to receive a liver model mask. From operations 1010 and 1020, the flow in method 1000 proceeds to operation 1025, which indicates to obtain the original liver mask. From operation 1025, the flow in method 1000 proceeds to operation 1040, which also receives input of external kidney data in operation 1030, and which indicates to revise the liver data. From operation 1040, the flow in method 1000 proceeds to operations 1050 and 1055, which both indicate region growing. From operation 1050, the flow proceeds to operation 1060, which indicates obtaining region grown liver data. Likewise, from operation 1055, the flow proceeds to operation 1065, which also indicates obtain region grown liver data. From operation 1060, the flow proceeds to operation 1080, which also receives input of external kidney data in operation 1030 and external heart data in operation 1070. Operation 1080 indicates to obtain original internal liver data. From operation 1080, the flow proceeds to operation 1090, which indicates to obtain a clean internal mask. From operation 1090, the flow proceeds to operation 1097, which indicates to obtain internal liver data.

From operation 1065, the flow proceeds to operation 1085, which also receives input of internal kidney data in operation 1035 and internal heart data in operation 1075. Operation 1085 indicates to obtain original external liver data. From operation 1085, the flow proceeds to operation 1095, which indicates to obtain a clean external mask. From operation 1095, the flow proceeds to operation 1099, which indicates to obtain external liver data. From operations 1097 and 1099, the flow in method 1000 proceeds to the end oval.

Method 1000 includes two sub-steps: first, liver regions initialization, and second, liver regions refinement. In the step of liver regions initialization, the goal is to extract the internal data and the external data of the liver, and to ensure the internal data is included in the liver and the liver is included in the external data. The program revises the liver data according to the liver model data and external data of the kidney, and then the program extracts the internal/external data of the liver.

During the course of extracting the internal data of the liver, the program first erodes the liver model data. Then the region growing algorithm executes seeds from the base slice mask of the liver model. The action of removing external data of spine, heart, and/or kidney is also performed. Next, the internal mask data of the liver is cleaned to ensure that the internal liver data is all in the range of the liver.

The method of extracting the external data of the liver is similar to the method of extracting the internal data of the liver. The program first executes the region growing algorithm for seeds that are from the base slice mask of the liver model data. Data of the spine, heart, and/or kidney are also removed. The external mask data of the liver is cleaned to ensure that the liver data is in the range of the external liver data. Finally, a dilation action to the external liver data is executed.

Figure 11:
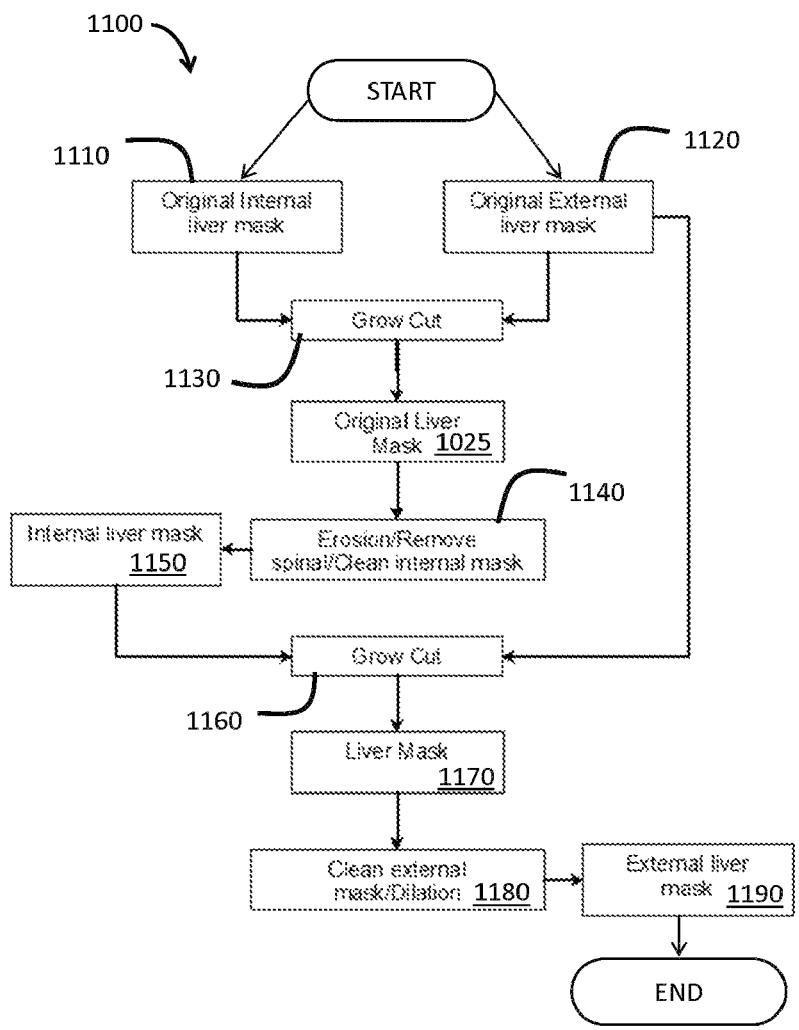
FIG. 11 is a flow chart illustrating a method for refining liver regions, in accordance with an embodiment of the present disclosure.

FIG. 11 is a flow chart illustrating method 1100 for refining liver regions. From the start oval, the process flows to operation 1110, which indicates to receive the original internal liver mask. The flow in method 1100 also proceeds from the start oval to operation 1120, which indicates to receive the original external liver mask. From operations 1110 and 1120, the flow in method 1100 proceeds to operation 1130, which indicates to perform a grow cut. From operation 1130, the flow proceeds to operation 1025, which indicates to obtain the original liver mask. From operation 1025, the flow proceeds to operation 1140, which indicates to perform erosion, remove the spine, and clean the internal mask. From operation 1140, the flow proceeds to operation 1150, which indicates to obtain the internal liver mask. From operation 1150, the flow proceeds to operation 1160, which also receives input from operation 1120, and which indicates to perform a grow cut. From operation 1160, the flow proceeds to operation 1170, which indicates to obtain the liver mask. From operation 1170, the flow in method 1100 proceeds to operation 1180, which indicates to clean the external mask and perform dilation. From operation 1180, the flow proceeds to operation 1190, which indicates to obtain the external liver mask. From operation 1190, the flow in method 1100 proceeds to the end oval.

Method 1100 refines the internal and/or external liver data to make the internal data larger and the external data smaller. Based on the original internal/external liver data, the algorithm executes the method of grow cut to get the original liver data mask. After the action of erosion of the original liver data mask, the external spine is removed and the internal mask is cleaned to obtain the internal liver data.

Based on the internal liver data and the original external liver data, the algorithm executes the threshold grow cut method to obtain the liver data mask. Then the external mask is cleaned, and the dilation action is performed. Then the program obtains the external liver data.

Figure 12:
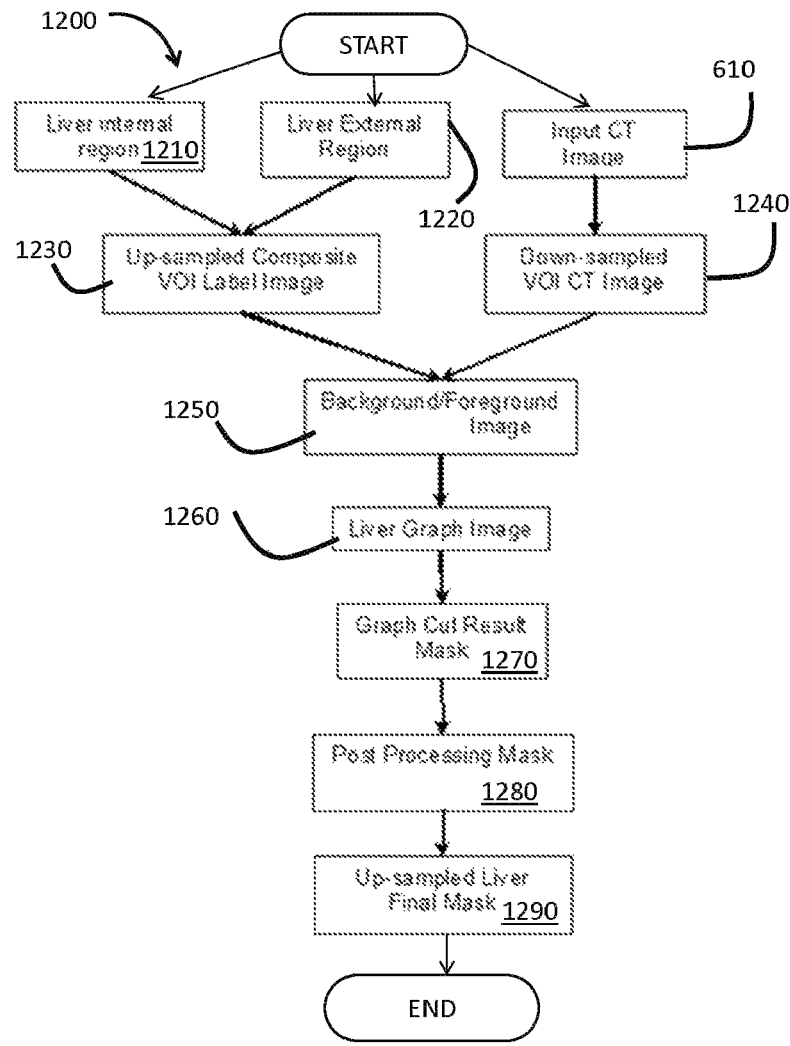
FIG. 12 is a flow chart illustrating a method of generating a liver final mask, in accordance with an embodiment of the present disclosure.

FIG. 12 is a flow chart illustrating method 1200 of generating a liver final mask. From the start oval, the process flows to operations 1210, 1220, and 610. Operation 1210 indicates to obtain liver internal region, and operation 1220 indicates to obtain liver external region. Operation 610 indicates to obtain input CT image. From operations 1210 and 1220, the flow in method 1200 proceeds to operation 1230, which indicates to up-sample a composite VOI (volume of interest) label image. From operation 610, the flow proceeds to operation 1240, which indicates to down-sample the VOI CT image. From operations 1230 and 1240, the flow in method 1200 proceeds to operation 1250, which indicates to identify the likely background and foreground image. From operation 1250, the flow proceeds to operation 1260, which indicates to obtain a liver graph image. From operation 1260, the flow proceeds to operation 1270, which indicates to perform a graph cut to obtain a resulting mask. From operation 1270, the flow proceeds to operation 1280, which indicates to perform post-processing on the mask. From operation 1280, the flow proceeds to operation 1290, which indicates to up-sample a liver final mask. From operation 1290, the flow in method 1200 proceeds to the end oval.

The graph cuts method (also known as a max flow algorithm) has been employed to efficiently solve a wide variety of computer vision problems such as image segmentation. Based on liver internal region and external regions, a modified graph cut may be applied to do liver segmentation.

A minimum volume of interest (VOI) region is extracted to reduce CPU usage. Then, the algorithm labels liver internal region pixels as foreground and the pixels outside the external region as background. The region which is inside the external boundary and outside the internal boundary is treated as unknown, and remains to be segmented and/or labeled. (See FIG. 4). A Gaussian Mixture Model (GMM) may be used to analyze the foreground and background statistical information. Then the foreground/background likelihood image will be built based on the statistical information.

Then a graph is created and an augment-path max flow algorithm is applied to calculate each pixel's label (foreground and background). When creating the graph, only the unknown region and its closest neighbor pixels are considered in order to reduce the memory and CPU usage. Finally, the algorithm does morphological post processing and the label mask result is up-sampled to the original image resolution.

Figure 13:
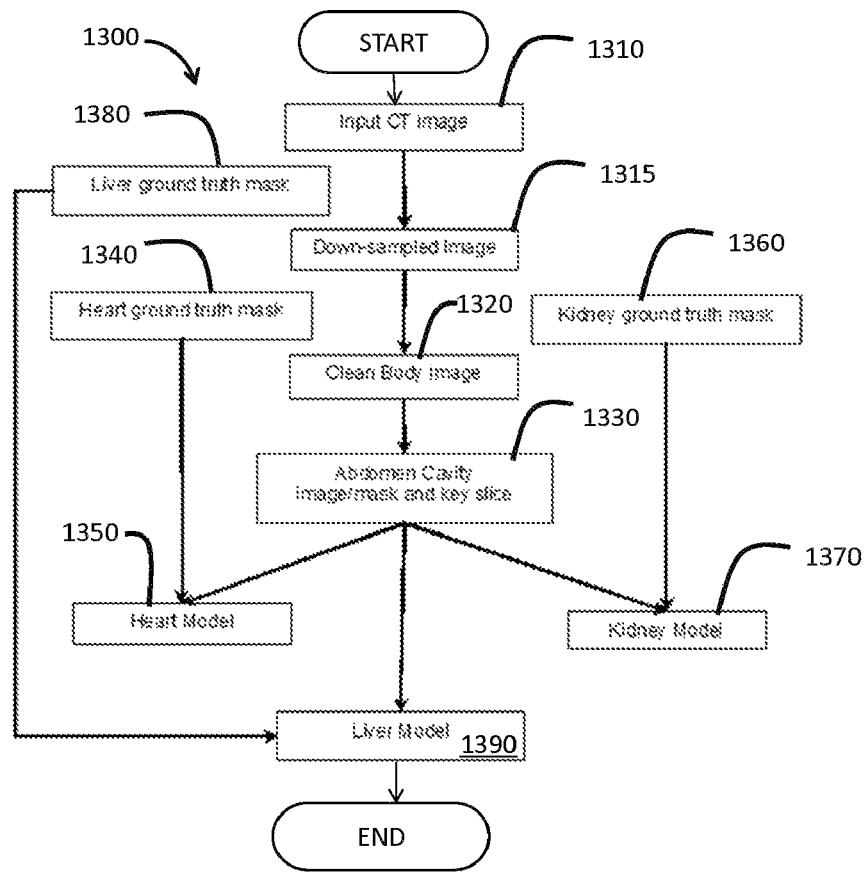
FIG. 13 is a flow chart illustrating a method of generating a trained heart, kidney, and/or liver model, in accordance with an embodiment of the present disclosure.

FIG. 13 is a flow chart illustrating method 1300 of generating a trained heart, kidney, and/or liver model. From the start oval, the process flows to operation 1310, which indicates to input the CT image. From operation 1310, the flow proceeds to operation 1315 which indicates to down-sample the image. From operation 1315, the flow proceeds to operation 1320, which indicates to clean the body image. From operation 1320, the flow proceeds to operation 1330, which indicates to extract abdomen cavity mask and identify a key slice of the CT image. The information from operation 1330 is output into operations 1350, 1370, and 1390, which represent the heart, kidney, and liver models, respectively. The heart model also has as an input the heart ground truth mask from operation 1340. Similarly, the kidney model also has as an input the kidney ground truth mask from operation 1360. From operation 1390, the flow proceeds to the end oval.

The model training procedure is similar to the procedure of the input image process. After down-sampling, cleaning the body image, and extracting cavity and key slice information, the user drawn ground truth mask is translated and scaled to generate models. Ground truth data are imported and accumulated together to generate a final trained model.

Figure 14:
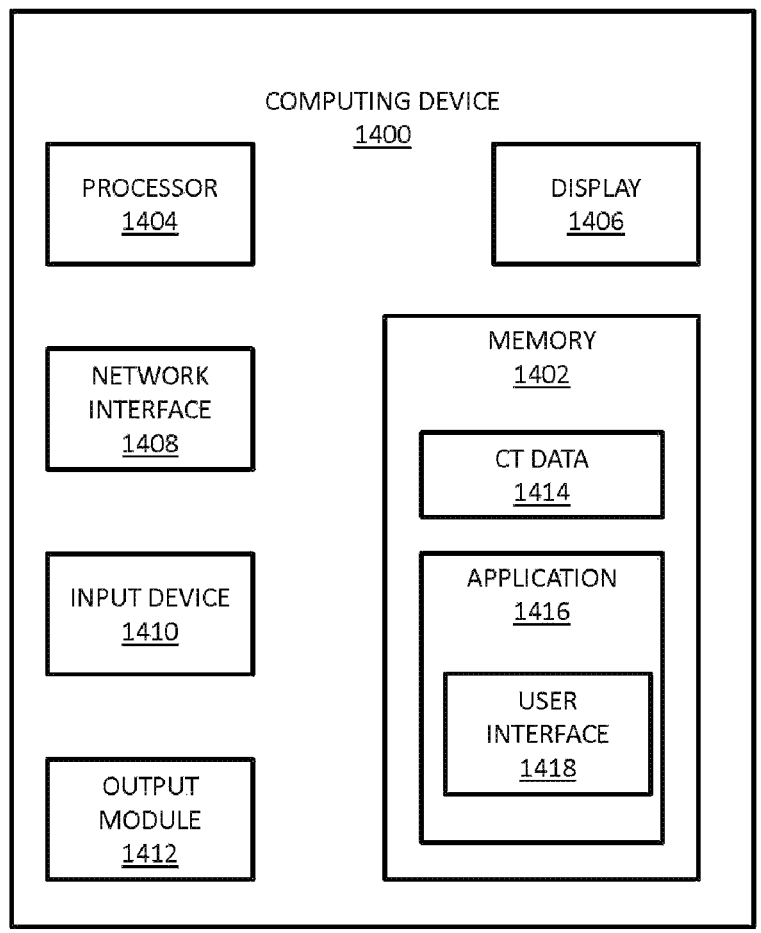
FIG. 14 is a schematic diagram of a computing device for use in accordance with an illustrative embodiment of the present disclosure.

Referring to FIG. 14, the present disclosure may use, or be executed by, a computing device 1400, such as, for example, a laptop, desktop, tablet, or other similar device, having a display 1406, memory 1402, one or more processors 1404 and/or other components of the type typically found in a computing device. Display 1406 may be touch sensitive and/or voice activated, enabling display 1406 to serve as both an input and output device. Alternatively, a keyboard (not shown), mouse (not shown), or other data input devices may be employed.

Memory 1402 includes any non-transitory, computer-readable storage media for storing data and/or software that is executable by processor 1404 and which controls the operation of the computing device 1400. In an embodiment, the memory 1402 may include one or more solid-state storage devices such as flash memory chips. Alternatively or in addition to the one or more solid-state storage devices, memory 1402 may include one or more mass storage devices connected to the processor 1404 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 1404. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by the computing device 1400.

Memory 1402 may store CT data 1414, which may be raw or processed data. Additionally, memory 1402 may store application 1416, which may be executable by processor 1404 to run any programs described herein. Application 1416 may include instructions for operation of user interface 1418, which may utilize input device 1410.

Computing device 1400 may also include a network interface 1408 connected to a distributed network or the internet via a wired or wireless connection for the transmission and reception of data to and from other sources. For example, computing device 1400 may receive computed tomographic (CT) image data of a patient from a server, for example, a hospital server, internet server, or other similar servers, for use during surgical ablation planning. Patient CT image data may also be provided to computing device 1400 via a removable memory 1402.

A liver segmentation module may include a software program stored in memory 1402 and executed by processor 1404 of the computing device 1400. A liver segmentation module may communicate with a user interface 1418 which may generate a user interface for presenting visual interactive features to a clinician, for example, on the display 1406 and for receiving clinician input, for example, via input device 1410. For example, user interface module 1418 may generate a graphical user interface (GUI) and output the GUI to the display 1406 for viewing by a clinician.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A method for identifying a liver in a CT image of a patient, comprising:
   applying a liver model to the CT image;
   extracting, from the CT image based on the applied liver model, an internal liver region boundary, a foreground region surrounded by the internal liver region boundary and representing an interior portion of the liver, an external liver region boundary surrounding the internal liver region and the foreground region, and an uncertain region bounded between the external liver region boundary and the internal liver region boundary, the uncertain region representing an area of the CT image that is not yet determined to be a portion of the liver or to not be a portion of the liver; and
   performing a graph cut algorithm on the CT image based on the internal liver region boundary, the foreground region, the external liver region boundary, and the uncertain region, to produce a liver image.

2. The method according to claim 1, further comprising:
   applying a heart model to the CT image; and
   extracting an internal heart region and an external heart region from the CT image based on the applied heart model;
   wherein the performing of the graph cut algorithm on the CT image to produce the liver image is further based on the internal heart region and the external heart region.

3. The method according to claim 2, further comprising:
   applying a kidney model to the CT image; and
   extracting an internal kidney region and an external kidney region from the CT image based on the applied kidney model;
   wherein the performing of the graph cut algorithm on the CT image to produce the liver image is further based on the internal kidney region and the external kidney region.

4. The method according to claim 3, wherein extracting the internal liver region boundary from the CT image is further based on the external kidney region and the external heart region.

5. The method according to claim 3, wherein extracting the external liver region boundary from the CT image is further based on the internal kidney region and the internal heart region.

6. The method according to claim 1, further comprising:
   extracting a body mask from the CT image;
   wherein the performing of the graph cut algorithm on the CT image to produce the liver image is further based on the body mask.

7. The method according to claim 6, further comprising:
   extracting a cavity mask from the CT image based in part on the body mask;
   wherein the performing of the graph cut algorithm on the CT image to produce the liver image is further based on the cavity mask.

8. A non-transitory computer-readable storage medium encoded with a program that, when executed by a processor, causes the processor to perform the steps of:
   applying a liver model to a CT image;
   extracting, from the CT image based on the applied liver model, an internal liver region boundary, a foreground region surrounded by the internal liver region boundary and representing an interior portion of the liver, an external liver region boundary surrounding the internal liver region and the foreground region, and an uncertain region bounded between the external liver region boundary and the internal liver region boundary, the uncertain region representing an area of the CT image that is not yet determined to be a portion of the liver or to not be a portion of the liver; and
   performing a graph cut algorithm on the CT image based on the internal liver region boundary, the foreground region, the external liver region boundary, and the uncertain region, to produce a liver image.

9. The non-transitory computer-readable storage medium according to claim 8, wherein the program, when executed, further causes the processor to perform the steps of:
   applying a heart model to the CT image; and
   extracting an internal heart region and an external heart region from the CT image based on the applied heart model;
   wherein the performing of the graph cut algorithm on the CT image to produce the liver image is further based on the internal heart region and the external heart region.

10. The non-transitory computer-readable storage medium according to claim 9, wherein the program, when executed, further causes the processor to perform the steps of:
    applying a kidney model to the CT image; and
    extracting an internal kidney region and an external kidney region from the CT image based on the applied kidney model;
    wherein the performing of the graph cut algorithm on the CT image to produce the liver image is further based on the internal kidney region and the external kidney region.

11. The non-transitory computer-readable storage medium according to claim 10, wherein extracting the internal liver region boundary from the CT image is further based on the external kidney region boundary and the external heart region.

12. The non-transitory computer-readable storage medium according to claim 10, wherein extracting the external liver region boundary from the CT image is further based on the internal kidney region boundary and the internal heart region.

13. The non-transitory computer-readable storage medium according to claim 8, wherein the program, when executed, further causes the processor to perform the steps of:
   extracting a body mask from the CT image;
      wherein the performing of the graph cut algorithm on the CT image to produce the liver image is further based on the body mask.

14. The non-transitory computer-readable storage medium according to claim 13, wherein the program, when executed, further causes the processor to perform the steps of:
   extracting a cavity mask from the CT image based in part on the body mask;
   wherein the performing of the graph cut algorithm on the CT image to produce the liver image is further based on the cavity mask.

15. The method according to claim 1, further comprising training the liver model using a ground truth mask image.

16. The non-transitory computer-readable storage medium according to claim 8, wherein the program, when executed, further causes the processor to perform the step of training the liver model using a ground truth mask image.

\* \* \* \* \*